United States Patent
Prestoy

(10) Patent No.: US 8,122,478 B2
(45) Date of Patent: *Feb. 21, 2012

(54) METHOD AND SYSTEM FOR INTERACTIVE MULTIMEDIA

(75) Inventor: Mark G. Prestoy, Westwood, MA (US)

(73) Assignee: Verizon Corporate Services Group Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/897,190

(22) Filed: Oct. 4, 2010

(65) Prior Publication Data

US 2011/0035778 A1    Feb. 10, 2011

Related U.S. Application Data

(63) Continuation of application No. 09/252,326, filed on Feb. 18, 1999, now Pat. No. 7,810,123.

(60) Provisional application No. 60/074,965, filed on Feb. 18, 1998.

(51) Int. Cl.
   *H04N 7/173* (2011.01)

(52) U.S. Cl. ............. 725/91; 725/93; 725/114; 709/219

(58) Field of Classification Search .................. 725/138, 725/144–147, 86–105, 112–117; 709/217–231
See application file for complete search history.

(56) References Cited

U.S. PATENT DOCUMENTS

| | | | | |
|---|---|---|---|---|
| 4,616,263 A | * | 10/1986 | Eichelberger | ................. 348/722 |
| 5,267,351 A | * | 11/1993 | Reber et al. | ............................ 1/1 |
| 5,442,390 A | | 8/1995 | Hooper et al. | |
| 5,610,841 A | | 3/1997 | Tanaka et al. | |
| 5,646,676 A | * | 7/1997 | Dewkett et al. | ................. 725/92 |
| 5,671,377 A | | 9/1997 | Bleidt et al. | |
| 5,717,854 A | * | 2/1998 | Egawa et al. | ................. 709/219 |
| 5,771,435 A | | 6/1998 | Brown | |
| 5,781,227 A | * | 7/1998 | Goode et al. | ..................... 725/32 |
| 5,802,284 A | | 9/1998 | Karlton et al. | |
| 5,877,755 A | | 3/1999 | Hellhake | |
| 5,956,716 A | * | 9/1999 | Kenner et al. | ........................ 1/1 |
| 5,973,722 A | | 10/1999 | Wakai et al. | |
| 5,983,068 A | | 11/1999 | Tomich et al. | |
| 5,991,373 A | | 11/1999 | Pattison et al. | |
| 6,014,706 A | * | 1/2000 | Cannon et al. | ................. 709/231 |
| 6,028,600 A | | 2/2000 | Rosin et al. | |

(Continued)

OTHER PUBLICATIONS

Armbuster, Heinrich, "The Flexibility of ATM: Supporting Future Multimedia and Mobile Communications", IEEE Communications Magazine, pp. 76-84, Feb. 1995.

(Continued)

*Primary Examiner* — Annan Q Shang

(57) ABSTRACT

A high capacity interactive multimedia system is provided that can deliver large number of concurrent video on demand and high speed data streams in an integrated fashion to a plurality of subscribers located at one or more subscriber sites. A video server module in the system generates a plurality of video on demand streams, which are transported via a high capacity transport system to a plurality of clients located at a subscriber site. A web server in the system stores data, such as web pages, which are also transported via the high capacity transport system to the clients. By accessing the web pages, a plurality of subscribers interact with the system via the clients. The interactive multimedia system controls and monitors in a centralized fashion the hardware and software components of the system, thus assuring the quality of the video and data services provided to the subscribers.

23 Claims, 10 Drawing Sheets

U.S. PATENT DOCUMENTS

| | | | |
|---|---|---|---|
| 6,052,715 A * | 4/2000 | Fukui et al. ............... 725/114 |
| 6,073,218 A | 6/2000 | DeKoning et al. |
| 6,108,684 A * | 8/2000 | DeKoning et al. ........... 718/105 |
| 6,112,237 A * | 8/2000 | Donaldson et al. ........... 709/224 |
| 6,122,237 A | 9/2000 | Ohmori et al. |
| 6,128,467 A | 10/2000 | Rege |
| 6,139,197 A | 10/2000 | Banks |
| 6,151,325 A * | 11/2000 | Hluchyj ................ 370/398 |
| 6,195,680 B1 | 2/2001 | Goldszmidt et al. |
| 6,208,335 B1 | 3/2001 | Gordon et al. |
| 6,266,817 B1 | 7/2001 | Chaddha |
| 6,272,281 B1 | 8/2001 | De Vos et al. |
| 6,275,855 B1 | 8/2001 | Johnson |
| 6,286,142 B1 * | 9/2001 | Ehreth ............... 725/78 |
| 6,314,572 B1 | 11/2001 | LaRocca et al. |
| 6,321,298 B1 | 11/2001 | Hubis |
| 6,442,604 B2 | 8/2002 | Romine |
| 6,574,667 B1 | 6/2003 | Blumenau et al. |
| 6,578,070 B1 | 6/2003 | Weaver et al. |

OTHER PUBLICATIONS

W. Pugh and G. Boyer, "Broadband Access: Comparing Alternatives", IEEE Communications Magazine, pp. 34-46, Aug. 1995.

M.P. Vecchi, "Broadband Networks and Services: Architecture and Control", IEEE Communications Magazine, pp. 24-32, Aug. 1995.

A. Jain, W Fischer, and P-Y Sibille, "An Evolvable ATM-based Video Network Design supporting Multiple Access Network Technologies", IEEE Communications Magazine, pp. 58-53, Nov. 1995.

* cited by examiner

METHOD AND SYSTEM FOR INTERACTIVE MULTIMEDIA

CROSS-REFERENCE TO RELATED APPLICATIONS

This is a continuation of U.S. application Ser. No. 09/252,326 filed Feb. 18, 1999 (allowed), the contents of which are incorporated herein by reference, which claims the benefit of U.S. Provisional Application No. 60/074965, filed Feb. 18, 1998, the contents of which are incorporated herein by reference.

BACKGROUND OF THE INVENTION

1. Field of the Invention

The present invention relates to video and data networks and, more particularly, to a method and system for delivering interactive multimedia.

2. Background of the Art

With recent advancements in communication network and video server technologies, a growing number of multimedia systems are emerging. These emerging multimedia systems generally can deliver both video (e.g., video on demand) and data (e.g., web based information from the Internet) to about 200 to 400 subscribers located at one or more geographically dispersed subscriber sites, which may include hotels or a multi-dwelling corporate offices.

These emerging multimedia systems, however, have several disadvantages: First, despite the recent advancements in communication network and video server technologies, these emerging systems have limited capacity: i.e., cannot deliver more than 400 concurrent video on demand and high speed data streams to a large number of subscribers. Second, as the number of subscribers at a subscriber site increases, the number of concurrent video streams and data that must be delivered to the subscribers generally increases as well. However, the capacity of these emerging systems cannot be expanded to address this increased demand without a significant redesign of these systems. Third, subscribers generally cannot use the video and data services provided by these systems in an interactive fashion. Finally, these emerging systems have failed to deliver high quality video and data in an integrated fashion because of the diverging network requirements for transporting video and data.

It is therefore desirable to improve upon these emerging multimedia systems.

SUMMARY OF THE INVENTION

Methods and systems consistent with the present invention provide an improved multimedia system that has several advantages over the prior art: First, the improved multimedia system can deliver a large number of concurrent video on demand and high speed data streams, such as 500, 1000 or more concurrent video streams, in an integrated fashion to a large number of subscribers, while assuring a high video quality. Second, subscribers can interact with the system through web-based interactive user interfaces. Third, the system is scalable, i.e. its capacity, such as the number of concurrent video streams and the total duration of the video titles stored, can be increased without redesigning the system. Fourth, the system can monitor and control in a centralized fashion its respective hardware and software modules, thus assuring the quality of video and data services provided to the subscribers.

In accordance with methods and systems consistent with the present invention, a high capacity interactive multimedia system is provided that comprises a video server module that includes a plurality of massively parallel nodes for streaming a plurality of video streams from one or more video titles stored in the video server module, a web server that stores data, a high capacity transport system for transporting the video streams and the data to a plurality of clients, and a set of display devices connected to the clients, respectively, for displaying the video streams and the data. The data stored in the web server may include web pages through which subscribers interact with the interactive multimedia system. The system also includes a controller for controlling and monitoring the video server module, the web server, the high capacity transport system, and the clients.

High capacity is defined herein to include delivery of more than 400 concurrent video on demand streams to a large number of clients. Alternatively, super high capacity is defined herein to include delivery of 1000 or more concurrent video on demand streams to a large number of clients. The clients may include set top boxes, personal computers, or other computing devices capable of receiving video and data streams on high speed bidirectional connections and displaying the streams on display monitors. A high speed connection is defined herein to include connections that transport integrated video and data streams at speeds of 25 Mbps or greater.

This summary and the following description of the invention should not restrict the scope of the claimed invention. Both provide examples and explanations to enable others to practice the invention. The accompanying drawings, which form part of the description of the invention, show several embodiments of the invention, and together with the description, explain the principles of the invention.

DETAILED DESCRIPTION

The following description of embodiments of this invention refers to the accompanying drawings. Where appropriate, the same reference numbers in different drawings refer to the same or similar elements.

In accordance with methods and systems consistent with the present invention, a high capacity interactive multimedia system is provided that can deliver a large number of concurrent video and data streams, such as 500 or more, in an integrated fashion to a plurality of subscribers located at one or more subscriber sites. A video server module in the system generates a plurality of video streams, which are transported via a high capacity transport system to a plurality of clients located at a subscriber site. A web server in the system stores data, such as web pages, which are also transported via the high capacity transport system to the clients. By accessing the web pages, a plurality of subscribers interact with the system via the clients. The interactive multimedia system controls and monitors in a centralized fashion the hardware and software components of the system, thus assuring the quality of the video and data services provided to the subscribers.

Figure 1:
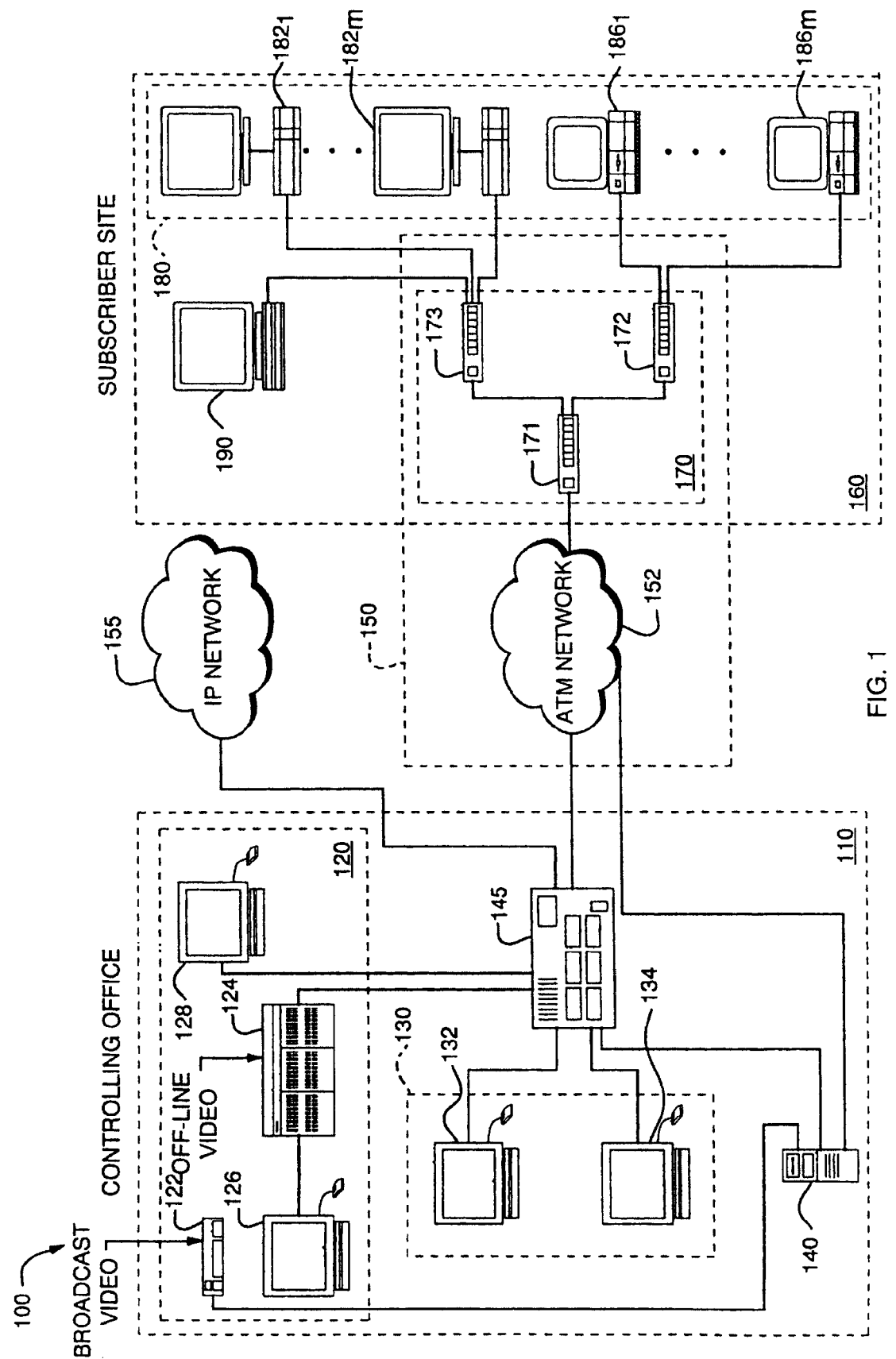
FIG. 1 is a block diagram of an interactive multimedia system in accordance with methods and systems consistent with the present invention.

FIG. 1 is a block diagram of an interactive multimedia system (IMS) 100 in accordance with methods and systems consistent with the invention. IMS 100 comprises a controlling office 110, which connects via a high capacity transport system 150 to a subscriber site 160 or, alternatively, to a plurality of subscriber site. Controlling office 110 includes a content provider module 120, a management module 130, and a video server module 140, all interconnected via a LAN switch 145. LAN switch 145 and video server module 140 each connect to high capacity transport system 150. Controlling office 110 may also interface via LAN switch 145 with an Internet Protocol (IP) network 155 such as the Internet.

High capacity transport system 150 comprises an ATM network 152 and a network access module 170. ATM network 152 includes one or more ATM switches, which interface with video server module 140 and LAN switch 145 in controlling office 110. Network access module 170, which resides in subscriber site 160, connects to ATM network 152.

Subscriber site 160, which may be, for example, a hotel or other dwelling, comprises a customer premises module 180 and an operator console 190, all connected to network access module 170.

Content Provider Module

Content provider module 110 comprises a real-time encoder 122, an off-line encoder 114, a personal computer 126, and an authoring console 128. Real-time encoder 122 includes, for example, a Lucent SE-1™ digital video system manufactured by Lucent Technologies, Inc. Real-time encoder 122 compresses video streams in Motion Picture Experts Group-2 (MPEG-2) format at a rate of 1.5 to 15 Mbps. An input of real-time encoder 122 may receive real-time video, such as video from a video conference or a live broadcast. An output of real-time encoder 122 connects to video server modulo 140, which stores the compressed video for real-time or off-line transmission to set top boxes $182_1$-$182_M$ or personal computers $186_1$-$186_M$.

Off-line encoder 124 includes, for example, an Optivision™ video recorder/player (e.g., model VS-40), which compresses video streams in MPEG-2 or MPEG-1 formats. Off-line encoder 124 may include a 9-Gigabits hard drive, a 4×CD recorder, or an 8 mm tape drive. Off-line encoder 124 connects to LAN Switch 145 using a standard 10baseT or 100baseT network port. An operator may locally control the operation of off-line encoder 124 via an attached keyboard and a mouse. Off-Line encoder 104 may receive input from a video camera, laser disc player, or a Video Cassette Recorder (VCR). The input may be in form of digital frames, which are stored on a D1 tape or comply with a conventional encoding standard, such as National TV Standardization Committee (NTSC), Phase Alternate Line (PAL), or S-VHS standards.

Authoring console 128 may be a personal computer, which may include Windows NT™ operating system developed by Microsoft, Netscape Navigator Gold™ software developed by Netscape, and Ulead PhotoImpact™ software developed by Ulead Systems. A system developer may use the Netscape Navigator Gold™ software to develop, publish, and test web pages, which function as the graphical user interface for IMS 100. The system developer may use the Ulead PhotoImpact™ software to create, for example, graphics on the web pages. After testing the web pages, the system developer may download the web pages onto web server 134, where the web pages may be accessed by customer premise module 180.

Video Server Module

Figure 2:
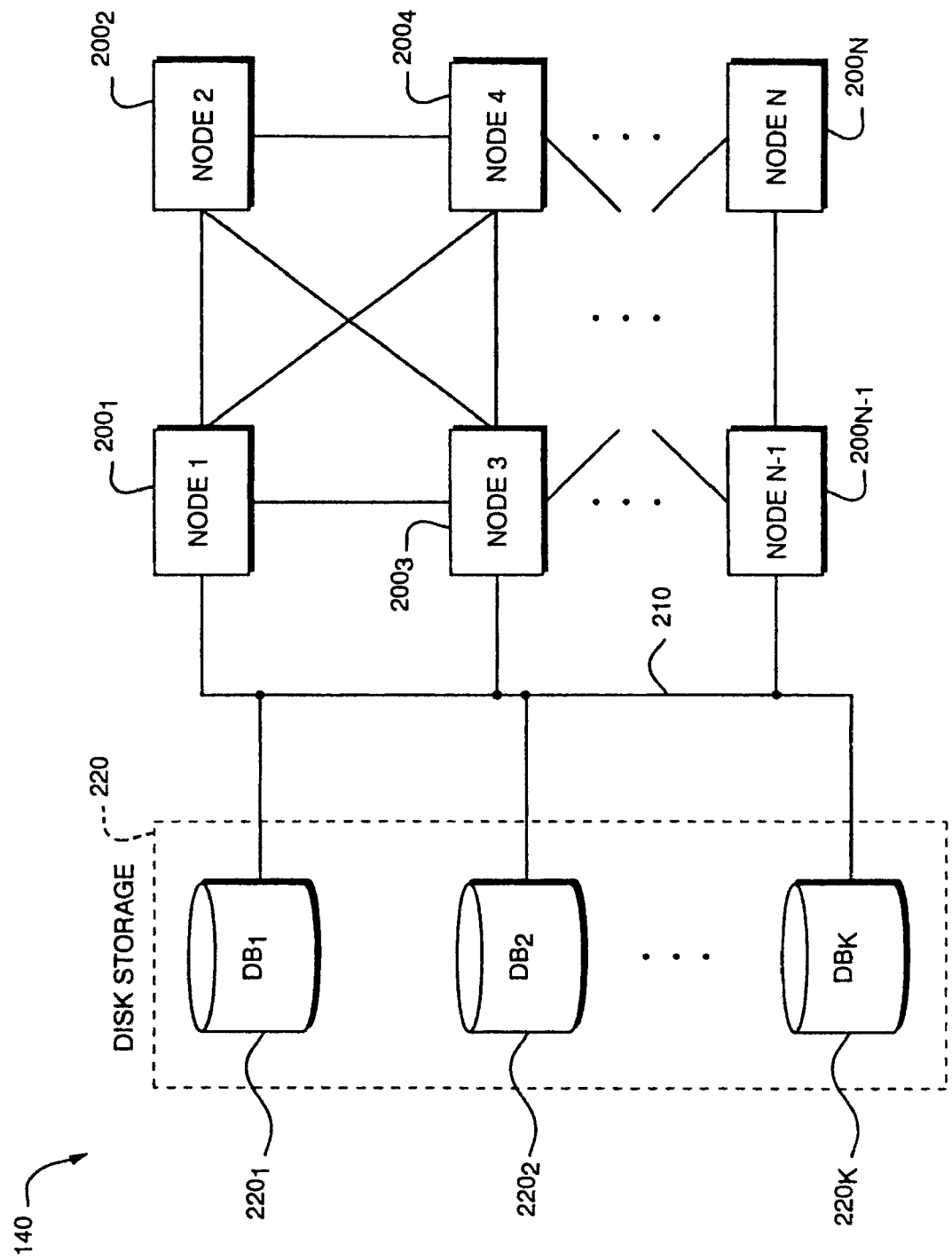
FIG. 2 is a block diagram of a video server module in accordance with methods and systems consistent with the present invention.

FIG. 2 is a block diagram of video server module 140 in accordance with methods and systems consistent with the invention. Video server module 140 may include, for example, a MediaCUBE 3000™ video server manufactured by nCUBE. As shown, video server module 140 comprises N nodes $200_1$-$200_N$, which are interconnected in a Hypercube configuration and connect via a bus 210 to a disk storage 220. The number of nodes $200_1$-$200_N$, N, may be in the range of 1 to 10000, and may be configured based on the number of video streams that must be concurrently delivered to subscriber site 160 and the bit rate of the video streams. The maximum number of concurrent video streams may be increased by increasing the number of nodes $200_1$-$200_N$.

Disk storage 220 includes an array of K hard disks $220_1$-$220_K$, which store video titles in stripped form and in MPEG-2 format at, for example, 3-6 Mbps encoding rate. The number of hard disks $220_1$-$220_K$, K, may be in the range 1 to 256, and may be configured based on the total duration of the video titles that must be stored. To provide multiple, concurrent, time displaced access to a single video title, each video title is divided into small segments (called stripes), which are stored throughout disks $220_1$-$220_K$. The total duration of video titles stored may increased by increasing the number hard disks $220_1$-$220_K$.

Nodes $200_1$-$200_N$ retrieve the stripped video associated with video titles from disks $220_1$-$220_K$, and recombine the retrieved stripped video into contiguous video streams. Nodes $200_1$-$200_N$ then convert the video streams into ATM format for transporting the video streams over ATM network 152.

Figure 3:
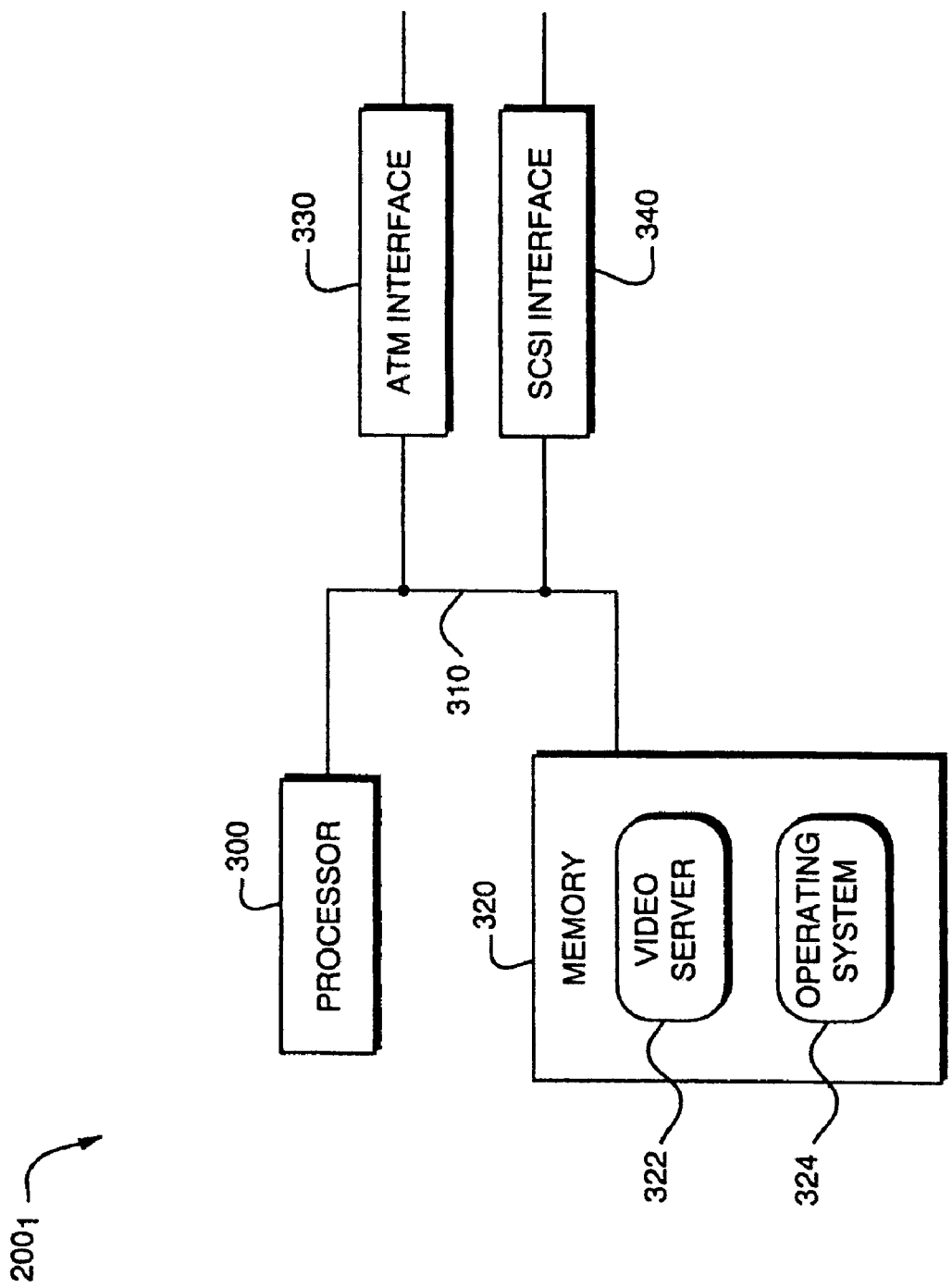
FIG. 3 is a block diagram of a node in a video server module in accordance with methods and systems consistent with the present invention.

FIG. 3 is a block diagram of a nod, for example node $200_1$, in video server module 140 in accordance with methods and systems consistent with the invention. Node $200_1$ comprises a processor 300, which connects via a bus 310 to a memory 320, an ATM interface module 330, and a Small Computer System Interface module (SCSI interface) 340.

Memory 320 includes an operating system 324 and a video server program 322, which are executed by processor 300.

Operating system 324 may include MediaCUBE 3000™ operating system software developed by nCUBE. Video server program 322 may include, for example, Oracle Video Server™ software developed by Oracle, which retrieves stripped video titles from disks $220_1$-$220_K$, and recombines the retrieved stripped video titles into contiguous video streams using the Real Time Streaming Protocol (RTSP).

ATM interface module 330, which connects to high capacity transport system 150 via a 155 Mbps (OC-3) or 622 Mbps (OC-12) link, formats each video stream into a plurality of ATM cells, and transmits the cells via ATM network 150 on a pre-established bidirectional 25 Mbps connection using, for example, the ATM Adaptation Layer 5 (AAL5) or AAL1 protocols. The quality of service parameters, which may include cell delay variation, cell transfer delay, and cell loss ratio, may be predetermined based on the desired quality of the video that must be delivered to customer premise module 180.

SCSI interface module 340 includes a 16 bit channel with a 20 Mbps throughput for retrieving stripped video titles from hard disks $220_1$-$220_K$ using the Small Computer System Interface (SCSI) protocol.

Network Access Module

Network access module 170 includes ATM switch 171, which connects via, for example, bidirectional STM-1 multi-mode fiber links to ATM switches 172 and 173. ATM switch 171 may be a FORE ASX-1000™ ATM switch manufactured by FORE Systems, Inc. ATM 171 may include, for example, a 10 Gbps switch fabric with 16 line card slots.

ATM switches 172 and 173 connect via bidirectional 25 Mbps ATM links or via bidirectional 10 to 100 Mbps Ethernet links to customer premise module 180. In the case of 25 Mbps ATM links, ATM switches 172 and 173 may each include a FORE ASX-200WG-D1™ ATM switch manufactured by FORE Systems, Inc. Furthermore, ATM switches 172 and 173 each may include, for example, a 2.5 Gbps switch fabric with 4 line card slots. A system administrator may configure ATM switches 171-173 via system controller 132.

Customer Premise Module

Referring back to FIG. 1, customer premise module 180 includes a plurality of clients such as, set top boxes $182_1$-$182_M$ and personal computers $186_1$-$186_M$. A system administrator assigns to each of set address, a Virtual Path Identifier (VPI), and a Virtual Circuit Identifier (VCI), and stores the same in a network database in system controller 132. A VPI and VCI combination uniquely identifies a pre-established bidirectional 25 Mbps ATM connection, which is dedicated to each of set top boxes $182_1$-$182_M$ and personal computers $186_1$-$186_M$.

Figure 4:
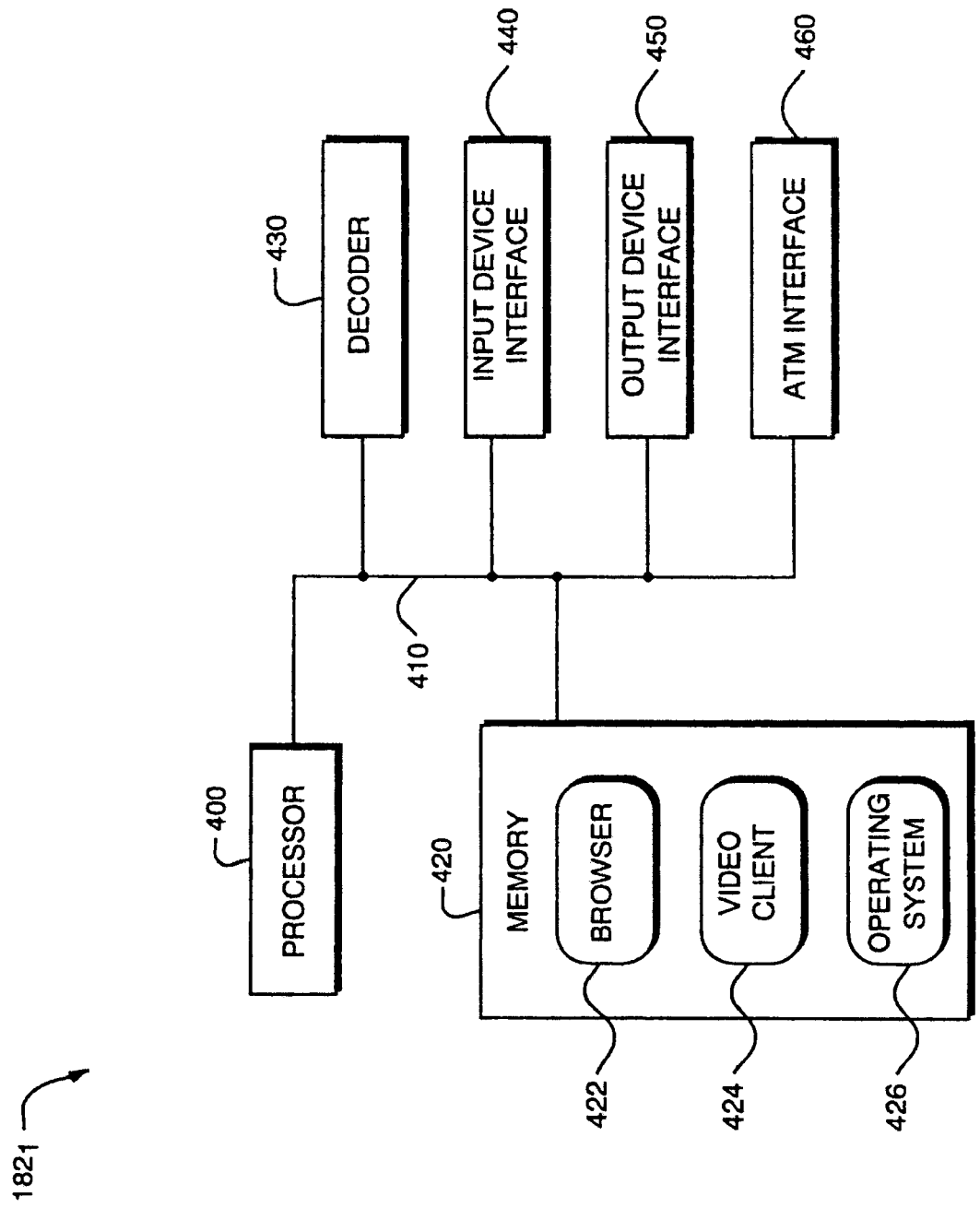
FIG. 4 is a block diagram of a set top box in accordance with methods and systems consistent with the present invention.

FIG. 4 is a block diagram of a set top box, for example set top box $182_1$, in accordance with methods and systems consistent with the invention. Set top box $182_1$ may be an Online Media STB2™ manufactured by Acorn. As shown, set top box $182_1$ comprises a processor 400, which connects via a bus 410 to a memory 420, a decoder 430, an input device interface 440, an output device 450, and an ATM interface module 460.

Memory 420 includes a browser program 422, a video client program 424, and an operating system 426, which are executed by processor 400. Browser program 422 may include a web browsing software, such as the Lite™ web browsing software developed by Acorn.

Browser program 422 may communicate with web server 124 using the Hypertext Transfer Protocol (HTTP). Browse program 422 may retrieve from web server 124 data files $526_1$-$526_P$ (e.g., web pages), which may be in Hypertext Markup Language (HTML) format and may include text, graphics, audio, and video. The web pages, which serve as a graphical user interface, may include lists of video titles indexed by actors, directors, category (e.g., western, suspense, comedy, or drama) and lists of information such as, weather and news, on-line shopping, interactive games, and broadcast video.

Browser program 422 may also communicate via web server 134 with IP network 155, and retrieve web pages from web sites that can be accessed via IP network 155. Browser program 422 may then display the retrieved web pages via output device interface 450 on a display monitor.

Video client program 424 receives via ATM interface module 460 a video stream on a pre-established bidirectional 25 Mbps connection in ATM network 152, decodes the video stream using decoder 430, and displays the video stream via output device interface 450 on a display monitor. Furthermore, video client program 424 formats video control commands, for example Play, Forward, Reverse, Stop, and Pause commands, which are received via input device interface 440, and sends the commands via the pre-established connection to video server module 130 using, for example, the Oracle Media Net™ protocol.

Input device interface 440 interfaces with, for example, a remote control device, a keyboard, or a joystick for receiving subscriber commands. A subscriber may interact with set top box $182_1$ via, for example, a remote control device by moving a cursor to a highlighted text or object and clicking on the text or the object. Browser program 422 and video client program 424 interpret the clicking action as a command or request, which ATM interface module 460 formats into one or more ATM cells and transmits to controlling office 110.

Output device interface 450 interface with a display monitor, such as a television set or a display monitor, for displaying data and video received, respectively, by browser program 422 and video client program 424.

In addition, set top box $182_1$ may include a Macrovision™ chip set manufactured by Macrovision for preventing a subscriber at subscriber site 160 from taping or recording a video stream received by set top box $182_1$.

Personal computers $186_1$-$186_M$ may include any computer, such as IBM compatible PCs or Macintosh PCs. Each personal computer $186_1$-$186_M$ may include Windows NT™ operating system developed by Microsoft, Macintosh™ operating system developed by Apple Computer, Inc., or Netscape® Navigator™ web browsing software developed by Netscape.

In addition, each personal computer $186_1$-$186_M$ includes a Network Interface Card (NIC) and software for receiving a video stream on a pre-established 25 Mbps ATM connection or a 10 to 100 Mbps Ethernet connection dedicated to the personal computer, and for sending video control commands via the pre-established connection to video server module 140.

Using the Netscape® Navigator™ web browsing software, each personal computer $186_1$-$186_M$ may communicate with web server 134 using the HTTP protocol, and retrieve web pages from web server 134 and other web sites in the Internet.

Management Module

Referring back to FIG. 1, management module 130 includes system controller 132 and web server 134, both of which connect to LAN switch 145. System controller 132, which may be a SUN SPARC™ workstation manufactured by SUN Microsystems, Inc., includes a UNIX™ operating system and a Hewlett Packard OpenView™ (HP OpenView) software developed by Hewlett Packard. System controller 132 monitors, for example, web server 134, video server module 140, ATM network 152, network access module 170, and set top boxes $182_1$-$182_M$.

System controller 132 monitors each module, for example set top boxes $182_1$-$182_M$, video server module 140, and network access module 170, by sending at fixed intervals echo messages to each module using the Simple Network Management Protocol (SNMP). When a module does not respond to an echo message, system controller 132 determines a fault condition. When system controller 132 detects a fault condition, it notifies a system administrator by displaying a color coded fault indication on a display monitor and by adding an entry to a fault log.

Figure 5:
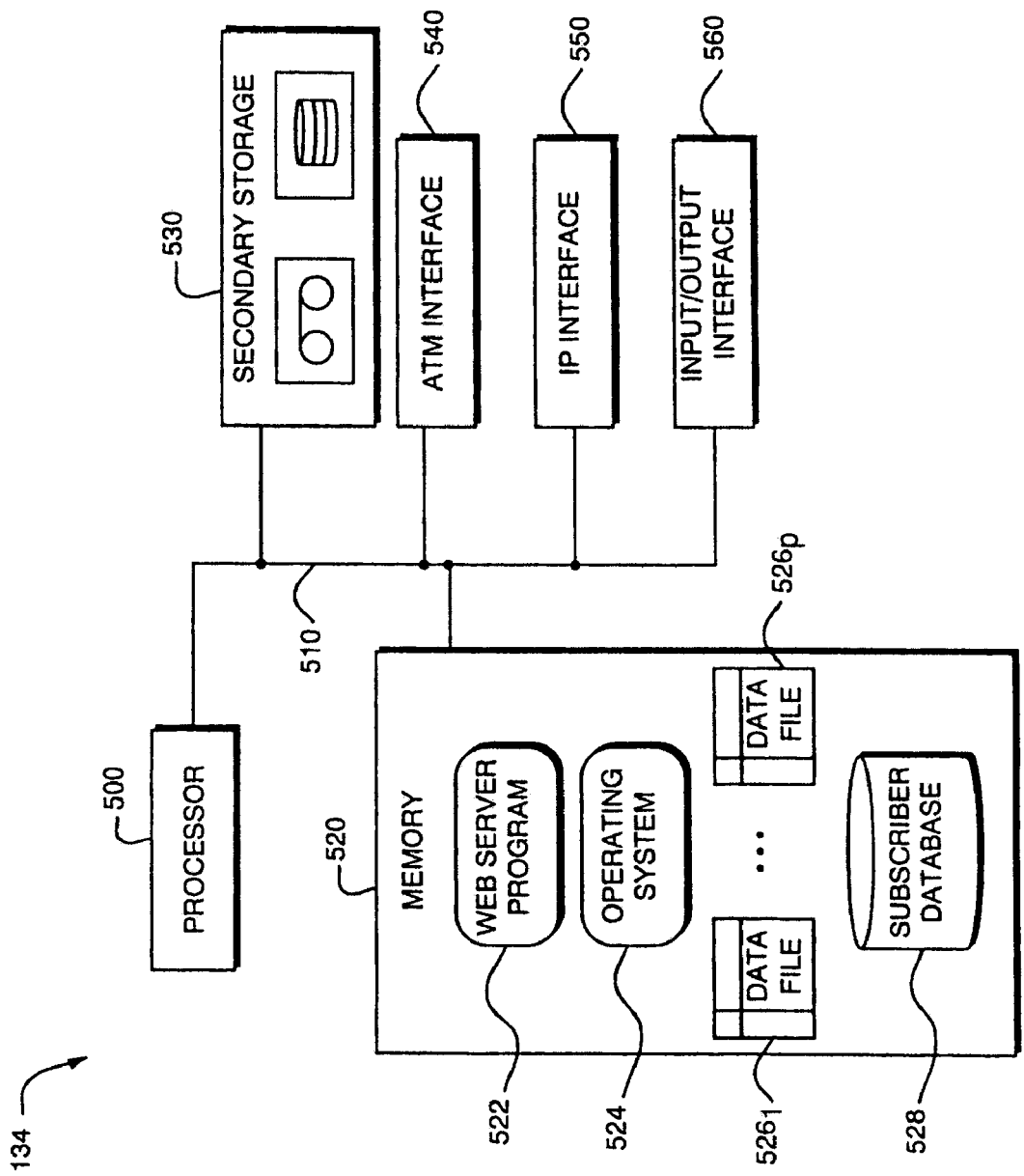
FIG. 5 is a block diagram of a web server in accordance with methods and systems consistent with the present invention.

FIG. 5 is a block diagram of web server 134 in accordance with methods and systems consistent with the present invention. As shown, web server 134 comprises a processor 500, which connects via a bus 510 to memory 520, secondary storage 530, ATM interface module 540, IP interface module 550, and input/output interface 560.

Memory 520 comprises a web server program 522, an operating system 524, a set of data files $526_1$-$526_P$, and a subscriber database 528. Web server program 522 and operating system 524 include sets of instructions in the form of software, which processor 500 executes. Web server program 522 may provide access to data files $526_1$-$526_P$, verify subscriber authorization when requesting access to data files $526_1$-$526_P$, send subscriber selections for video titles to video server module 140, and function as a gateway for accessing IP network 155, which subscribers may access via set top boxes $182_1$-$182_M$ and personal computers $186_1$-$186_M$.

Operating system 524 may include a Windows NT™ operating system developed by Microsoft. Data files $526_1$-$526_P$, which may be in HTML format, include listings of video titles by category, listings of information such as, weather and news, and listings of services, for example, on-line shopping and access to the Internet.

Subscriber database 528 includes an entry for each subscriber in subscriber site 160, where each entry identifies a particular level of access to data files $526_1$-$526_P$. For example, an entry may restrict a subscriber's access to a subset or none of data files $526_1$-$526_P$.

Secondary storage 530 comprises a disk drive and a tape drive or CD Read Only Memory (ROM). From the tape drive or CD ROM, software and data may be loaded onto the disk drive, which can then be copied into memory 510. Similarly, software and data in memory 510 may be copied onto the disk drive, which can then be loaded onto the tape drive or CD ROM.

ATM interface module 540 comprises hardware and software or firmware for sending and receiving ATM cells over ATM network 152.

IP interface module 550 comprises hardware and software or firmware for sending and receiving IP messages over IP network 155.

Input/output interface 560 comprises hardware and software for interfacing an input and an output device such as, a keyboard and a display monitor, respectively. A system administrator may add, delete, and update entries in subscriber database 528 via input/output interface 560. In addition, the system administrator may also add, delete, and update entries in subscriber database 528 via operator console 190, which communicates with web server 134 using a TCP/IP protocol.

Figure 6:
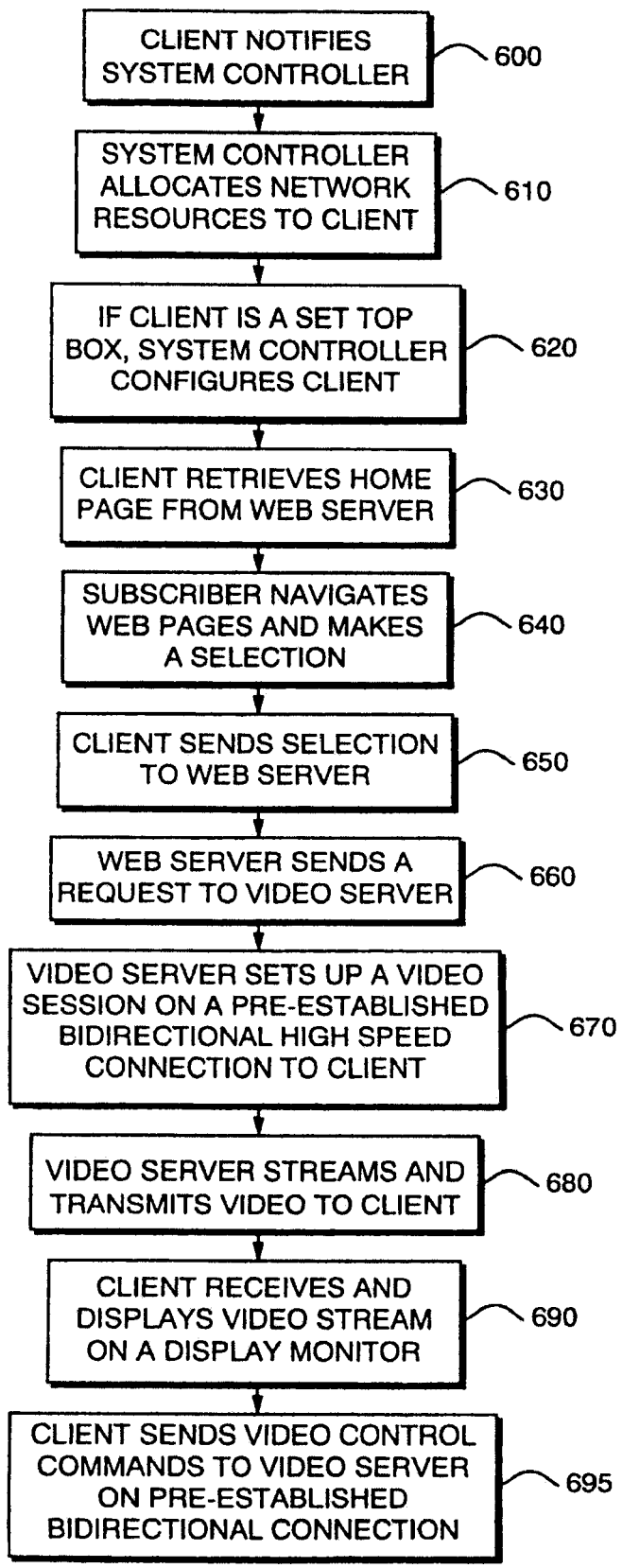
FIG. 6 is a flow chart of the steps performed by a set top box, a system controller, a web server, and a video server in an interactive multimedia system in accordance with methods and systems consistent with the present invention.

FIG. 6 is a flow chart of the steps performed by a client, for example, set top box $182_1$, system controller 132, web server 134, and video server module 140 in accordance with methods and systems consistent with the present invention. When a subscriber turns on set top box $182_1$, operating system 426 in set top box $182_1$ boots is up and sends a signal to system controller 132, notifying system controller 132 that set top box $182_1$ is on (step 600). In response to the signal, system controller 132 downloads pre-assigned IP address, VCI, and VPI information to set top box $182_1$ (step 610).

System controller 132 then configures set top box $182_1$ by downloading web browser program 422 into set top box $182_1$ using Network File System (NFS) protocol over TCP/IP protocol (step 620). After system controller 132 downloads web browser program 422 into set top box $182_1$, operating system 426 in set to box $182_1$ starts up web browser program 422.

Using the HTTP protocol, web browser program 422 then sends a request to web server 134 to retrieve a data file $526_1$-$526_P$ that includes a home page (step 630). After verifying the access level of set top box $182_1$ from subscriber data base 528, web server program 522 in web server 134 downloads the home page into set top box $182_1$. Web browser program 422 then displays the home page on a display monitor attached to set top box $182_1$.

Figure 7:
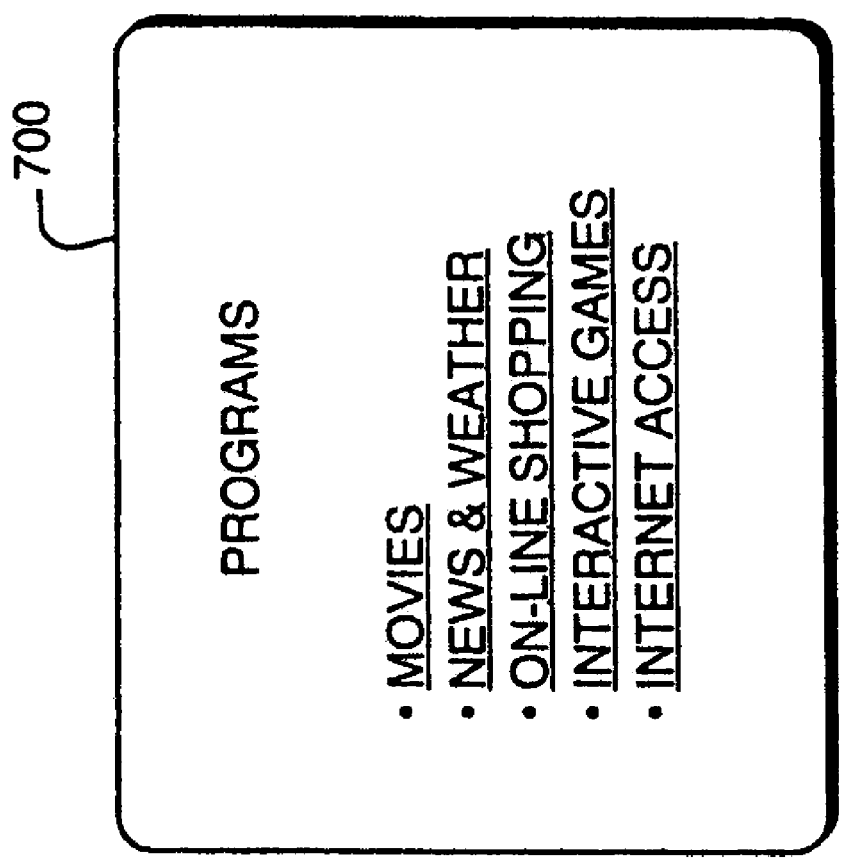
FIG. 7 is a block diagram of a listing of programs displayed on a display monitor in an interactive multimedia system in accordance with methods and systems consistent with the present invention.

FIG. 7 illustrates a home page 700 in accordance with methods and systems consistent with the invention. Home page 700 may include a listing of available programs, such as movies, news & weather, on-line shopping, interactive games, and access to the Internet.

Figure 8:
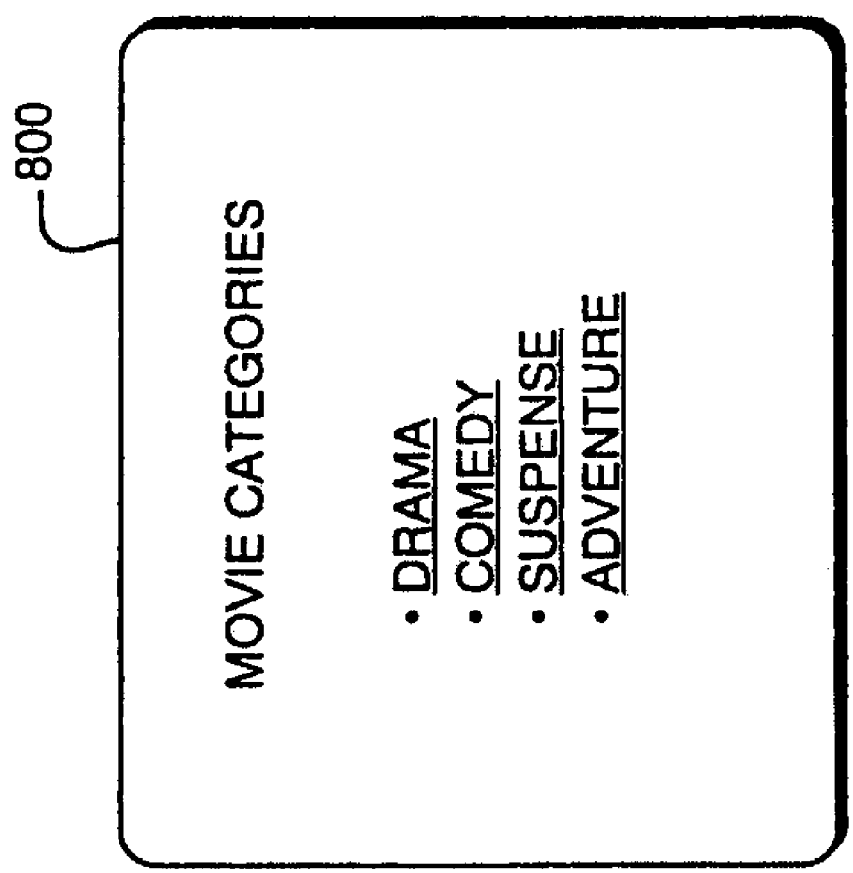
FIG. 8 is a block diagram of a listing of movie categories displayed on a display monitor in an interactive multimedia system in accordance with methods and systems consistent with the present invention.
Figure 9:
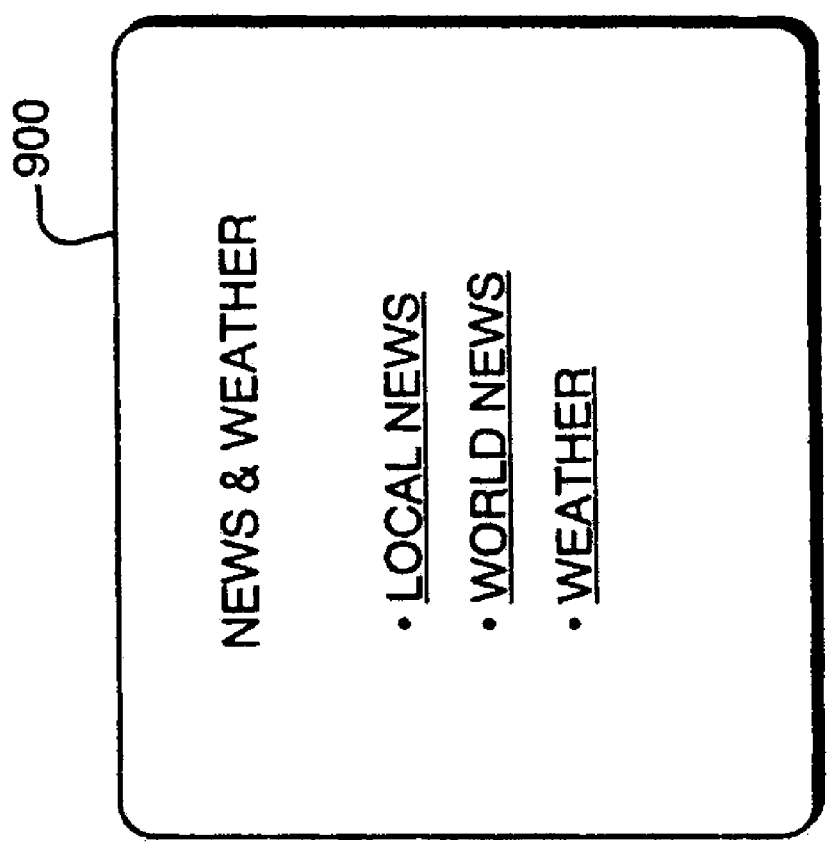
FIG. 9 is a block diagram of a listing of news and weather information displayed on a display monitor in an interactive multimedia system in accordance with methods and systems consistent with the present invention.
Figure 10:
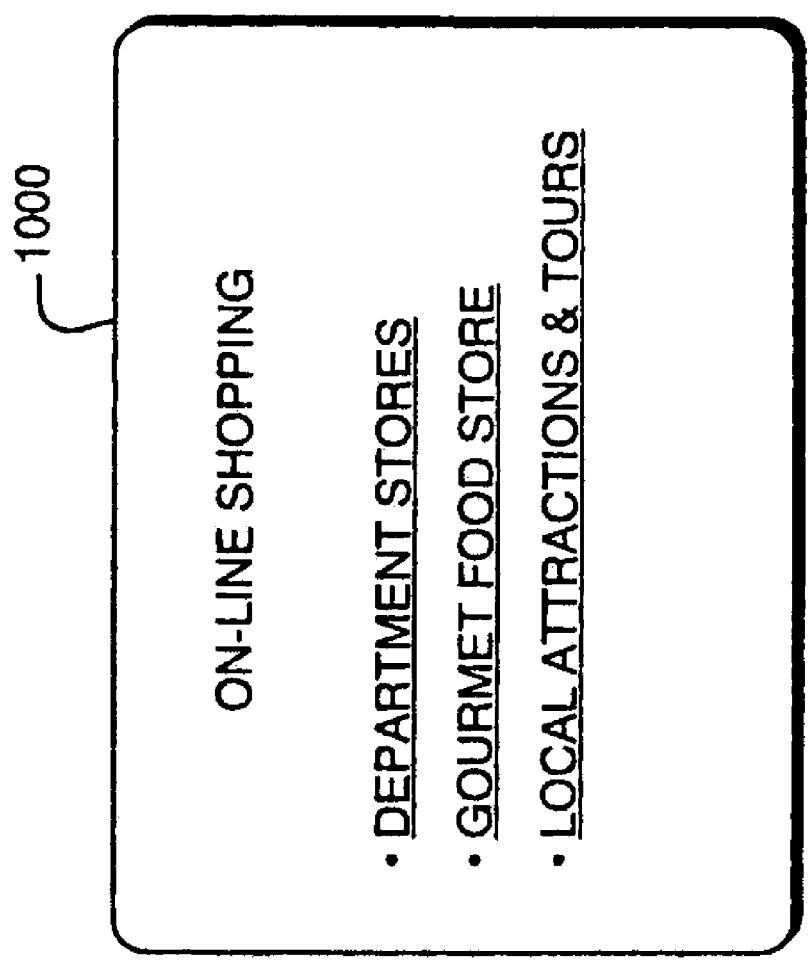
FIG. 10 is a block diagram of a listing of an on-line shopping services displayed on a display monitor in an interactive multimedia system in accordance with methods and systems consistent with the present invention.

The subscriber then navigates through the one or more web pages and makes a selection by clicking on a text or a graphical object or a web page (step 640). For example, when the subscriber clicks on the text "Movies" in home page 700, web browser program 422 retrieves from web server 134 and displays a listing of categories of video titles 800 (shown in FIG. 8) from which the subscriber can make a selection. Alternatively, when the subscriber clicks on the text "News & Weather" in home page 700, web browser program 422 retrieves from web server 134 and displays a listing of news and weather programs 900 (shown in FIG. 9), or when the subscriber clicks on the text "On-Line Shopping," web browser program 422 retrieves and displays a listing of stores 1000 (shown in FIG. 10).

After the subscriber selects a particular video title, web browser program 422 sends the selection to web server 134 (step 650). Web server program 522 in web server 134 then sends via LAN switch 145 to video server module 140 a request, identifying the selected video title and the IP address of set top box $182_1$ (step 660).

Video server program 322 in video server module 140 sets up a video session with set top box $182_1$ by mapping the IP address of set top box $182_1$ to a VCI and VPI combination, which uniquely identifies a bidirectional 25 Mbps connection in ATM network 152, which a systems administrator has pre-allocated to set top box $182_1$ (step 670). Video server program 322 may perform the mapping by using the IP address as an index into a pre-configured address table in video server module 140.

Video server program 322 retrieves the selected video title, which is stripped in form of smaller segments across disks $220_1$-$220_K$, and recombines the retrieved segments into contiguous video streams using the Real Time Streaming Protocol (RTSP) (step 680). Video server program 322 then sends the video stream to set top box $182_1$ on the pre-allocated bidirectional connection using the Oracle Media Net™ protocol over MPEG-2 and AAL5 protocols.

Video client program 424 in set top box 182₁ receives via ATM interface module 460 the video stream, decodes the video stream using decoder 430, and displays the decoded video stream via output device interface 450 on a display monitor (step 690). Furthermore, video client program 424 may receive via input device interface 440 video control commands from a remote control device (step 695). The control commands may include Play, Forward, Reverse, Stop, and Pause commands. Video client program 424 then formats and sends the commands via the pre-allocated bidirectional connection to video server module 140 using the Oracle Media Net™ protocol. When video server module 140 receives a Stop command, video server program 322 terminates the video session.

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A system, comprising:
   a video server that includes:
   a set of storage devices;
   a plurality of nodes configured to stream a plurality of video streams from a video title, the video title divided into segments stored in the set of storage devices, each of the plurality of nodes comprising a processor, each of the processors running a video server program configured to combine the segments stored in the set of storage devices into the plurality of video streams and to stream the plurality of video streams, and the processors all having concurrent access to said set of storage devices for concurrently streaming the plurality of video streams;
   a transport system to transport the plurality of video streams from the video server to a plurality of client devices; and
   a system controller configured to monitor the video server and client devices, wherein the monitoring includes sending echo messages to the video server, determining a fault condition when the video server does not respond to at least one of the echo messages, and displaying a color coded fault indication on a display of the system controller.

2. The system of claim 1, wherein the segments are stored throughout the set of storage devices.

3. The system of claim 1, wherein each of the plurality of client devices is configured to receive at least some of the plurality of video streams.

4. The system of claim 3, wherein the plurality of client devices includes at least one of a set top box or a personal computer.

5. The system of claim 1, further comprising:
   an encoder for encoding video and for storing the encoded video in the video server.

6. The system of claim 5, wherein the encoder comprises a real-time encoder for encoding real-time video.

7. The system of claim 5, wherein the encoder comprises an off-line encoder for encoding off-line video.

8. The system of claim 1, further comprising a web server to store data and send the data via the transport system to the plurality of client devices.

9. The system of claim 8, wherein each of the plurality of client devices comprises:
   a browser program to retrieve the data from the web server;
   a video client program to receive one of the video streams and control the video stream; and
   a processor to execute the browser program and the video client program.

10. The system of claim 8, wherein the web server interfaces an Internet Protocol (IP) network.

11. The system of claim 8, wherein the data is in Hypertext Markup Language (HTML) format.

12. The system of claim 1, wherein each of the plurality of nodes further comprises:
   an interface module configured to format the video streams into packets and transmit the packets on the transport system; and
   a disk controller configured to retrieve the video titles from the set of storage devices.

13. The system of claim 1, wherein the transport system includes one or more asynchronous transfer mode (ATM) networks.

14. The system of claim 13, wherein the transport system includes pre-established connections associated with the plurality of client devices, respectively.

15. The system of claim 1, wherein the video server program configures a video session with the plurality of client devices by mapping an IP address of each of the plurality of client devices to a network address of the client device.

16. A method comprising:
   receiving at a video server a plurality of requests initiated by each of a plurality of client devices to receive one or more video titles, the one or more video titles each divided into segments and stored in a set of storage devices;
   streaming by a plurality of nodes of the video server a plurality of video streams corresponding to the one or more video titles, wherein the plurality of video streams are formed by combining the segments stored in the set of storage devices, wherein each of the plurality of nodes comprises a processor having concurrent access to the set of storage devices, and wherein the plurality of video streams are streamed concurrently;
   transporting the plurality of video streams via a transport system;
   monitoring the video server at a system controller by sending echo messages to the video server;
   determining a fault condition when the video server does not respond to at least one of the echo messages; and
   displaying a color coded fault indication on a display of the system controller.

17. The method of claim 16, wherein the segments are stored throughout the set of storage devices.

18. The method of claim 16, further comprising:
   receiving each of the plurality of video streams at a respective requesting client of the plurality of plurality of client devices.

19. The method of claim 16, further comprising:
   encoding video received from a video input; and
   storing the encoded video as the video title in the video server.

20. The method of claim 19, wherein the encoding comprises at least one of encoding real-time video or encoding off-line video.

21. The method of claim 16, further comprising:
configuring a video session with each of the plurality of client devices by mapping an IP address of each of the plurality of client devices to a network address associated with said client device.

22. The method of claim 16, wherein receiving the plurality of requests initiated by each of a plurality of client devices includes:
transmitting by a web server to the plurality of client devices a graphical user interface including a number of indications corresponding to the one or more video titles;
receiving by the web server selections from the plurality of client devices of the one or more video titles; and
sending the plurality of requests from the web server to the video server, each of the plurality of requests including an identifier of a selected video title.

23. The method of claim 16, further comprising:
receiving at the video server from the plurality of client devices one or more control commands; and
adjusting the streaming of the plurality of video streams in accordance with the one or more control commands;
wherein the one or more control commands include at least one of a play, forward, reverse, stop and pause command.

* * * * *